United States Patent
Guerrini et al.

(10) Patent No.: US 9,139,960 B2
(45) Date of Patent: Sep. 22, 2015

(54) PAVING WITH A POLLUTION-ABATING ACTIVITY AND A PHOTOCATALYTIC MIXTURE FOR ITS PREPARATION

(75) Inventors: Gian Luca Guerrini, Cernusco sul Naviglio (IT); Jean-Pierre Grelaud, Saint Martin la Garenne (FR)

(73) Assignee: ITALCEMENTI S.P.A., Bergamo (IT)

( * ) Notice: Subject to any disclaimer, the term of this patent is extended or adjusted under 35 U.S.C. 154(b) by 283 days.

(21) Appl. No.: 12/989,804

(22) PCT Filed: Apr. 28, 2009

(86) PCT No.: PCT/EP2009/055112
§ 371 (c)(1),
(2), (4) Date: Oct. 27, 2010

(87) PCT Pub. No.: WO2009/133094
PCT Pub. Date: Nov. 5, 2009

(65) Prior Publication Data
US 2011/0041734 A1  Feb. 24, 2011

(30) Foreign Application Priority Data
Apr. 29, 2008  (IT) .............................. MI2008A0787

(51) Int. Cl.
C04B 24/36 (2006.01)
E01C 1/00 (2006.01)
C04B 28/02 (2006.01)
C04B 111/00 (2006.01)
C04B 111/70 (2006.01)

(52) U.S. Cl.
CPC ................. *E01C 1/005* (2013.01); *C04B 28/02* (2013.01); *C04B 2111/0075* (2013.01); *C04B 2111/70* (2013.01)

(58) Field of Classification Search
CPC ....................................................... E01C 1/005
USPC ............................................................ 404/17
See application file for complete search history.

(56) References Cited

U.S. PATENT DOCUMENTS 6,454,489 B1 * 9/2002 Murata et al. .................. 404/17
2007/0017417 A1 * 1/2007 Terruzzi ....................... 106/622

FOREIGN PATENT DOCUMENTS

JP        2002201056 A  *  7/2002

* cited by examiner

*Primary Examiner* — Mark Ruthkosky
*Assistant Examiner* — Ian Rummel
(74) *Attorney, Agent, or Firm* — Abelman, Frayne & Schwab

(57) ABSTRACT

A new photocatalytic composition is described that is designed for percolation in road surfaces. The composition contains no aggregates, but consists of cement, a photocatalyst, a superfluidifier, a viscosity modifier and an antifoaming agent, in suitable proportions. The composition is applied to porous open-graded asphalt courses, completely filling the cavities down to a thickness coming between 30 and 50 mm. The treated asphalt acquires a strong, durable photocatalytic activity, even when it is submitted to heavy mechanical loads and adverse weather conditions, as in the case of road surfaces in and out of town, liable to intense traffic.

8 Claims, 1 Drawing Sheet

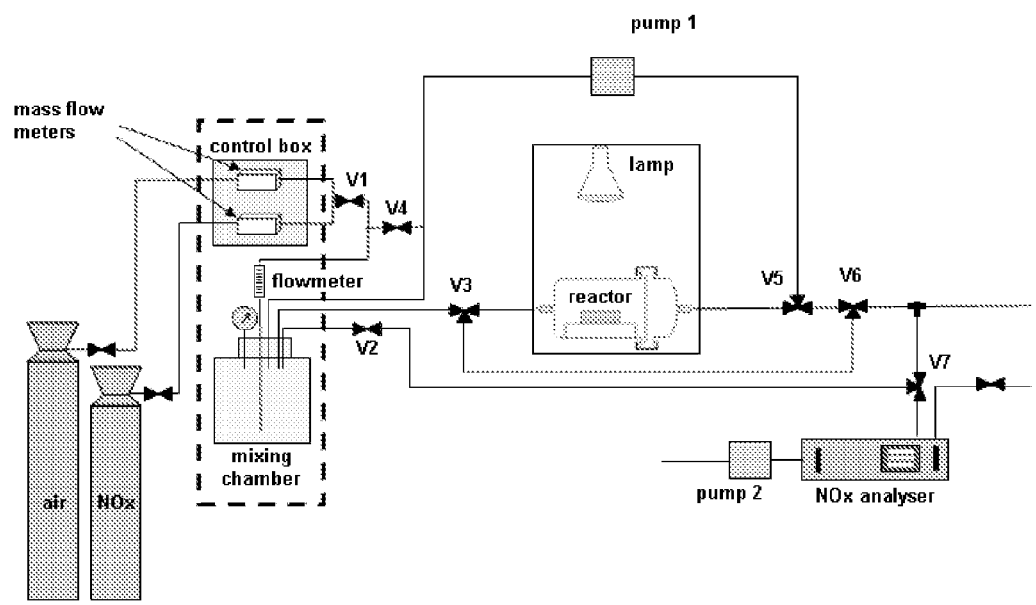

PAVING WITH A POLLUTION-ABATING ACTIVITY AND A PHOTOCATALYTIC MIXTURE FOR ITS PREPARATION

CROSS-REFERENCE TO RELATED APPLICATIONS

This application is a National Phase of PCT/EP2009/055112, filed 28 Apr. 2009 which claims priority from Italian Application No. MI2008A000787, filed 29 Apr. 2008, both of which are incorporated herein by reference.

FIELD OF THE INVENTION

The present invention relates to the sector of pollution-abating photocatalytic surfacing media for applications in areas in and out of town.

STATE OF THE ART

The constant increase in vehicle traffic, and heavy vehicles in particular, poses numerous problems in town centres and on roads with heavy traffic, including an increase in pollutant emissions.

To overcome this problem, it is well known that cement products are used that contain a photocatalyst capable of oxidising and abating environmental pollutants, particularly nitrogen oxides and dioxides ($NO_x$), sulphur oxides (SOx), and unburnt hydrocarbons produced by vehicle traffic; these cement products can be applied in various forms, e.g. as a coating on the walls of buildings in the vicinity of the emissions, as a coating on tunnel ceilings, or they may constitute the road surface itself. Completely replacing the asphalt with a cement paving is not an optimal solution, however, because the latter lacks the elasticity needed in many road applications and it is often noisy due to the presence of the joints needed to compensate for shrinkage, etc.

The patent application EP 1 752 429 proposed to make a pre-existing asphalt road surface with a suitable porosity adsorb adequate quantities of a photocatalytic cement product. Said application describes photocatalytic mortars for the partial impregnation of asphalted surfaces. A typical feature of these products is their capacity to penetrate the porosities in the asphalt surface, without percolating in depth. The product lends the asphalt good photocatalytic properties (i.e. the capacity to adsorb and decompose pollutants), but modest physical-mechanical properties. In fact, despite the content of silica fume, fibres and aggregates, necessarily added to increase the mechanical resistance of the composition, the mortar reveals a limited cohesiveness, especially in conditions of heavy rainfall, and it can easily be washed away from the road surface, with a loss of any photocatalytic efficacy and a deterioration of the surface concerned. It also does not guarantee the capacity of the mortar and asphalt system as a whole to withstand heavy working loads.

There are also various known asphalt-cement composites (e.g. Densiphalt®) without any photocatalytic activity that are used as floor toppings: these are fluid asphalt and cement mixtures that are often applied over pre-existing roads for the purpose of increasing their surface mechanical resistance. More fluid cement products (slurries) without any photocatalytic activity are often used to reinforce buildings, terrains, etc. For such purposes, the cement product is injected inside suitable cavities created in the substrate (EP 434 112, EP 967 187), or inside the sheaths of tie rods or of post-tensioning cables in prefabricated members during their installation.

To date, there have been no photocatalytic products for application on a road surface that assure a high resistance to surface abrasion and that feature an intensive and durable photocatalytic activity. There is a felt need, moreover, for new road surfaces with a strong and persistent pollution-abating activity, even when subjected to heavy vehicle traffic and adverse weather conditions.

DESCRIPTION OF THE FIGURES

FIG. 1: Diagram of the apparatus for determining the pollution-abating activity of the paving according to the invention.

SUMMARY

A new cement-based product for road surfacing applications has unexpectedly been found, that has a superior photocatalytic efficiency and a strong abrasion resistance. Said objects are achieved by percolating inside a porous open-graded asphalt a particular composition (or photocatalytic slurry) comprising a cement, a photocatalyst and preferably also a superfluidifier, a viscosity modifier and an antifoaming agent; these latter products are only added in quantities sufficient to obtain a product that, after suitable mixing with water, percolates in depth inside the asphalt. The asphalt treated in this way provides a semi-flexible two-component paving system with a high, durable photocatalytic activity even when submitted to heavy mechanical loading and adverse weather conditions, as in the case of road surfaces in and out of town that are liable to carry heavy traffic.

DETAILED DESCRIPTION OF THE INVENTION

The term "two-component semi-flexible paving" is used to mean a type of paving comprising a bituminous conglomerate of porous, open-graded asphalt, in the cavities of which the cement slurry according to the invention is percolated. This paving constitutes a surfacing and structural solution that must withstand the working loads due to vehicle traffic. It normally lacks any construction joints, unlike conventional concrete road surfaces.

The term slurry, or grout (coulis in French), is used to mean a watery cement composition containing no aggregates (for the definition of aggregates, see the UNI EN standard 12620: 2003).

The wording "capable of percolating in depth" is used to mean the capacity of the slurry to completely fill the cavities in a layer of porous open-graded asphalt with a mean thickness coming between 30 mm and 50 mm.

Porous, open-graded asphalt is well known and is used for road surfacing applications. It is an open-pore material consisting generally of one or more fractions of coarse aggregate (and substantially lacking in fine aggregate) and any fillers, all incorporated in an asphalt matrix (or bituminous binder). Such an asphalt has a high percentage content of cavities, generally coming between 20% and 40% v/v, and preferably between 25% and 35%. The percentage of bituminous binder (or bitumen, in accordance with the UNI EN standard 12591) generally varies from 4% to 7% w/w of the end product (bitumen, aggregates and any fillers). The asphalt is laid, using conventional asphalt paving jobsite machinery, over a layer of road surface that may be pre-existing (e.g. cement-bound granular material or traditional compacted bituminous asphalt), or specially prepared. The reference asphalt for measuring the penetration thickness for the purposes of the present patent application is the product called "0/14", which has the composition given in table 2. Said reference is considered simply as a non-limiting example since the slurries considered herein are applicable to any type of porous, open-graded asphalt.

The cement contained in the slurry is preferably a type 1 cement, as defined by the UNI EN standard 197-1, e.g. a grey or white Portland cement. Cement mixtures are also possible, e.g. Portland cement with rapid-setting cement (such as the sulphur-aluminous type) to reduce the hardening and maturing times.

The photocatalyst consists of one or more compounds capable of oxidising one or more environmental pollutants in the presence of ambient light, air and humidity. Among the environmental pollutants it is worth mentioning the $NO_x$, $SO_x$, and unburnt hydrocarbons. The preferred photocatalyst is titanium dioxide ($TiO_2$), at least partially in the crystallographic form of anatase, or one of its precursors. Preferred percentages of anatase are: at least 20%, at least 50%, at least 75%, or 100% w/w of the total $TiO_2$. Various types of anatase titanium dioxide are available, all of which are suitable for use in the invention; examples are AT1, PC50, PC 105, produced by Millennium Chemicals, which have different specific surface values. Mixtures of two or more titanium dioxides are preferably used in order to obtain different specific surfaces. Among the precursors of titanium dioxide, it is worth mentioning the so-called titanium paste that constitutes an intermediate product in the titanium dioxide production cycle.

Instead of the above-mentioned separate cement and photocatalyst, it is also possible to use a cement pre-mixed with a photocatalyst (or photocatalytic cement): an example of such a product is the TX Aria® cement (Italcementi).

The superfluidifier may be conveniently chosen from among those commonly available, such as melamine sulphonates, naphthalene sulphonates, polycarboxylates, etc., and combinations thereof. The polycarboxylates, such as Cimfluid Adagio P3 (Axim, France), are particularly preferred.

The viscosity modifier may be chosen from among those commonly available, such as hydroxyalkyl celluloses, hydroxyalkyl guars, starch and their derivatives, other polysaccharides, succinoglycans, polyoxyethylenes, polyurethanes, etc., and mixtures thereof. A hydroxyalkyl guar is preferably used, such as Collaxim P6 (Axim, France), with a degree of substitution of 2.3.

The antifoaming agent may be chosen from among those commonly available, typically one or more surfactant(s), with an HLB (or hydrophilic-lipophilic balance, i.e. the ratio of the hydrophilic, polar to the lipophilic, apolar portions) of 6. A preferred antifoaming agent is Désaerocim P1.

Siliceous powders such as silica fume, pozzolana, or other reactive additives are preferably not included in the slurry of the invention. The wording "preferably not included" is used to mean that although these species may optionally be used, they are not indispensable to the preparation of the present invention and the achievement of the technical effect described herein, as demonstrated in the experimental section.

The slurries of the invention are obtained by mixing the above-mentioned ingredients in the following preferred w/w proportions, calculated with respect to the cement: photocatalyst, between 0.01% and 8%, and preferably between 2% and 6%, e.g. 3.5%; superfluidifier, between 0.005% and 5%, and preferably between 0.01% and 0.5%, e.g. 0.29%; viscosity modifier, between 0.0005% and 0.1%, and preferably between 0.001% and 0.05%, e.g. 0.005%; antifoaming agent, between 0.001% and 0.1%, and preferably between 0.005% and 0.05%, e.g. 0.01%.

Other additives may optionally be included, e.g. (as a non-exhaustive example) $Cr^{VI}$ reducers, such as Reducem P, and expanding agents.

All the above-mentioned ingredients are preferably used in powder form and combined as dry ingredients to obtain a pre-mixed dry product that forms an integral part of the present invention. These products can be converted into slurry by mixing with a suitable amount of water. The water/cement ratio in the slurry is preferably between 0.65 and 0.33, and better still between 0.55 and 0.4, e.g. 0.48. The two-component semi-flexible paving prepared according to the invention may be any type of surfacing, particularly for roads or squares in or out of town, take-off runways or service hardstandings at airports, industrial paving, or any other type of surfacing liable to severe mechanical stress. All the above installations, mentioned here as a non-limiting example, form an integral part of the present invention. They are characterised by an upper surface consisting of a porous, open-graded asphalt, the surface and superficial cavities of which are respectively coated and percolated with the previously-described slurry. Said slurry spreads through the porosities in the asphalt down to a mean depth of between 30 and 50 mm. After the proper application and consolidation of the product, the water component evaporates and the slurry remains in situ in its dry state; the resulting paving forms an integral part of the present invention.

The paving of the invention may comprise the layer of porous asphalt percolated with the slurry alone, or it may comprise further underlying layers of any nature, e.g. normal asphalt, cement-bound granular material or simple soil.

Percolation is achieved by initially mixing the premixed dry product with a sufficient quantity of water in a suitable mixer (e.g. a drum-type concrete mixer) and subsequently pouring, spreading or pumping the slurry over the asphalt.

The coating of ample surface areas is easy to achieve using automated jet flow or pumping systems from one or more delivery points. The fluid mixture can be evenly distributed over the whole surface of the asphalt using known manual methods (brooms) or mechanical means (spreader machines). Percolation through the asphalt is ensured by the composition of the slurry, i.e. it is not necessary to use mechanical methods of any kind, e.g. vibrations, compacting, etc., to make the product percolate down to the required depth (which is why the slurry is defined as "self-percolating").

The asphalt thus treated then undergoes a maturing period to allow for the consolidation of the percolated product. For maturing in conditions of controlled humidity, the treated surface can be covered with a plastic or non-woven sheet.

Where the pre-existing surface being treated was not made of porous asphalt, a suitable layer of open-graded asphalt can be applied on top, according to known methods; after a suitable consolidation and cooling time (usually after 24 hours), the resulting conglomerate can be percolated with the slurry of the invention, according to the method described above.

As demonstrated in the experimental section, the present invention has achieved a product with a strong, durable photocatalytic activity. The slurry percolated inside the porous, open-graded asphalt forms a phase that is highly resistant to abrasion and wash out. Even after severe and repeated erosive stress, the resulting paving has shown that it continues to retain a strong photocatalytic activity, superior to that of known products. These excellent, unexpected results have advantageously been achieved without the need to add any of the materials commonly used to increase the material's mechanical strength, e.g. silica fume, aggregates or fibres. A photocatalytic paving has thus been achieved that is highly effective and simple to prepare, at low production costs.

The following examples further illustrate the invention without limiting its scope in any way.

EXPERIMENTAL SECTION

Example 1

Leaching Tests with Water

During the experiments, two samples consisting of the same porous asphalt called 0-14 were treated respectively with a mortar according to the patent application EP 1 752 429 (Fotofluid, a product manufactured by Global Engineering) and with the slurry according to the present invention, using the composition given in table 1. The composition of the porous asphalt (the particle size distribution of the aggregates and fillers and the bitumen content) are specified in table 2.

TABLE 1

|  | mass (g) | % (w/w of cement) |
|---|---|---|
| CEM I 52.5 R ULTRACEM Calusco | 2800 | 100 |
| Photocatalyst | 98 | 3.5 |
| Water | 1344 | 48 |
| Cimfluid Adagio P3 | 8 | 0.29 |
| Désaerocim P1 | 0.28 | 0.01 |
| Collaxim P6 | 0.14 | 0.005 |
| Reducem P | 2.52 | 0.09 |

TABLE 2

| OPEN-GRADED ASPHALT 0-14 | |
|---|---|
| mm | passing fraction % |
| 16 | 100 |
| 12.5 | 65-75 |
| 8 | 15-25 |
| 4 | 13-23 |
| 2 | 11-21 |
| 1 | 8-18 |
| 0.25 | 7-12 |
| 0.08 (filler) | 3-5 |

Bitumen/aggregate ratio 4% w/w

Submitted to leaching with drinking water for 24 hours to simulate a road's exposure to heavy rainfall, the reference samples showed a mass loss coming between 11% and 33% w/w of the total mass percolated inside the sample, whereas the samples treated with the product of the invention revealed a mass loss of less than 2%.

The slurry according to the present invention consequently showed a much higher resistance to leaching than the reference mortar. This was particularly surprising in consideration of the fact that the composition of the invention (unlike the reference mortar, which contained cement reinforced with aggregates and silica fume), would not appear to be classifiable as a cement product with a high structural performance.

Example 2

Photocatalytic Activity Tests after Surface Erosion

Further samples of open-graded asphalt obtained as in example 1, but not submitted to leaching, were tested to measure their NOx abating capacity over a period of 60 minutes.

The photocatalytic activity test was conducted using a method wherein a NO+NO$_2$ gas mixture was recirculated inside a reactor in which the samples were placed (draft UNI standard), FIG. 1.

The following apparatus was prepared to conduct this test:
1 bottle for containing the air;
1 bottle for the gases (NO$_x$), or two separate bottles for the NO and NO$_2$;
1 control system for measuring the mass flow of the gas (NO$_x$);
1 flow meter;
1 mixing chamber;
1 reactor;
1 lamp;
1 pump for recirculating the gas;
1 chemiluminescence analyser for the NO$_x$;
1 gas extractor pump (for the analyser);
connection fittings (valves, pipes and T joints)
1 pump for extracting the gas (see step 0)

The following procedure was used to perform the test:
Step 0: "cleaning" the system under a vacuum for 10 minutes.

In the Dark:
Step 1—preliminary analysis of the gas flow for 30 minutes, up until the flow became stable (rated values±20%)
Step 2—recirculating the gas flow in the reactor for 30 minutes
Step 3—(first) gas sampling—1 liter for 60 seconds
Step 4—recirculating the gas flow for 30 minutes
Step 5—(second) gas sampling—1 liter for 60 seconds
Step 6—preliminary analysis of the gas flow, for 30 minutes up until the flow became stable (rated values±20%)—then turning on the light In the Light:
Step 7—preliminary analysis of the gas flow for 30 minutes up until the flow became stable (rated values±20%).
Step 8—(first) gas sampling—1 liter for 60 seconds
Step 9—recirculating the gas flow in the reactor for 30 minutes
Step 10—(second) gas sampling—1 liter for 60 seconds
Step 11—switching off the light and all the pumps
End of the test.

The pollution abating activity was determined after 30 and 60 minutes:

$$\Delta NO_{x,30}\% = (C_{NOx,0} - C_{NOx,30})/C_{NOx,0}$$

$$\Delta NO_{x,60}\% = (C_{NOx,0} - C_{NOx,60})/C_{NOx,0}$$

where:
$C_{NOx,0}$=initial concentration
$C_{NOx,30}$=concentration of NOx after 30 minutes
$C_{NOx,60}$=final concentration of NOx after 60 minutes The results showed a substantially identical activity of the two samples after 60 minutes (88% for the reference product and 90% for the product of the invention). The samples were then submitted to a process of mechanical surface erosion that simulated the wear induced by vehicle traffic. The erosion was obtained in an identical manner on the two samples, removing the surface layer down to a depth of 2 mm: at this depth, the surface layer of cement product covering the outside of the asphalt had been completely removed and the cavities in the asphalt exposed on the surface contained equivalent quantities of cement product.

The samples treated in this way were used to repeat the NOx abating test, measured over a period of 60 minutes. The results showed a predictable reduction in the abating efficacy of the photocatalytic layer on the surface of the asphalt. Surprisingly, however, the residual activity was distinctly higher for the sample according to the invention, i.e. 73%, as opposed to 56% for the reference product. The data presented herein go to show that the slurry according to the invention offers the dual advantage of a high erosion resistance and a marked durability of its photocatalytic activity even after the accidental loss of the uppermost layers of the coating.

The invention claimed is:

1. A method for the preparation of a paving comprising a photocatalyst for abating the environmental pollutants that come into contact therewith, the paving having an improved resistance to water leaching together with durability of the photocatalytic activity, comprising a step of percolation of the surface of the paving with a slurry, the surface being made of a porous open-graded asphalt with a content of cavities between 20% and 40% v/v and the percolation being carried out with a photocatalytic slurry comprising water, cement, a photocatalyst and free of aggregates, down to a mean depth of between 30 mm and 50 mm by completely filling the cavities.

2. The method according to claim 1, wherein the slurry further comprises a superfluidifier, a viscosity modifier and an antifoaming agent.

3. The method according to claim 2, wherein the slurry comprises, in w/w proportions with respect to the cement: a photocatalyst between 0.01% and 8%; a superfluidifier between 0.005% and 5%; a viscosity modifier between 0.0005% and 0.1%; and an antifoaming agent between 0.001% and 0.1%.

4. The method according to claim 3, wherein the slurry comprises: a photocatalyst between 2% and 6%; a superfluidifier between 0.01% and 0.5%; a viscosity modifier between 0.001% and 0.05%; and an antifoaming agent between 0.005% and 0.05%.

5. The method according to claim 4, wherein the slurry comprises: a photocatalyst 3.5%; a superfluidifier 0.29%; a viscosity modifier 0.005%, and an antifoaming agent 0.01%.

6. The method according to claim 1, wherein the cement and photocatalyst are contained in the slurry as a single component in the form of a photocatalytic cement.

7. The method according to claim 1, wherein the photocatalyst consists of titanium dioxide, or titanium dioxides with different specific surfaces.

8. The method according to claim 2, wherein the superfluidifier is selected from the group consisting of melamine sulphonates, naphthalene sulphonates and polycarboxylates; the viscosity modifier is selected from the group consisting of hydroxyalkyl celluloses, hydroxyalkyl guars, starch or other polysaccharides, succinoglycans, polyoxyethylenes; and the antifoaming agent is a surfactant with an hydrophilic-lipophilic balance of less than 6.

* * * * *